United States Patent [19]
Yasuda et al.

[11] Patent Number: 5,889,549
[45] Date of Patent: Mar. 30, 1999

[54] COMMUNICATION APPARATUS HAVING CODING/DECODING MEANS RESPONSIVE TO A SETTABLE COEFFICIENT

[75] Inventors: Hitoshi Yasuda, Yokohama; Makoto Chida, Kawasaki, both of Japan

[73] Assignee: Canon Kabushiki Kaisha, Tokyo, Japan

[21] Appl. No.: 313,403

[22] Filed: Sep. 27, 1994

Related U.S. Application Data

[63] Continuation of Ser. No. 831,514, Feb. 5, 1992, abandoned.

[30] Foreign Application Priority Data

| Feb. 8, 1991 | [JP] | Japan | 3-017447 |
| Mar. 6, 1991 | [JP] | Japan | 3-040164 |
| Jan. 31, 1992 | [JP] | Japan | 4-016508 |

[51] Int. Cl.⁶ .................................................. H04N 7/14
[52] U.S. Cl. .................................. 348/14; 348/17; 348/19
[58] Field of Search ................................... 348/14, 15, 16, 348/17, 18, 19; 379/96, 102, 104, 105, 94, 93, 93.17, 93.21, 93.23, 102.02, 102.07; 381/56, 58; H04N 7/14

[56] References Cited

U.S. PATENT DOCUMENTS

| 4,534,057 | 8/1985 | Miyata et al. | 381/58 |
| 4,679,042 | 7/1987 | Trethewey | 381/56 |
| 4,980,761 | 12/1990 | Natori | 358/85 |
| 4,995,071 | 2/1991 | Weber et al. | 379/53 |
| 5,164,980 | 11/1992 | Bush et al. | 358/85 |

FOREIGN PATENT DOCUMENTS

| 0239076 | 9/1987 | European Pat. Off. |  |
| 0244260 | 11/1987 | European Pat. Off. |  |
| 0289051 | 11/1988 | European Pat. Off. |  |
| 0158182 | 9/1984 | Japan | 379/53 |
| 0226987 | 9/1990 | Japan | H04N 7/14 |
| 0237382 | 9/1990 | Japan | H04N 7/14 |

OTHER PUBLICATIONS

Pat. Abs. Jp. vol. 14, No. 537, Nov. 27, 1990 (JP–A–2226987).
Pat. Abs. Jp. vol. 14, No. 560, Sep. 27, 1990 (JP–A–2243082).
Signal Proc. Image Comm., No. 1, Feb. 3, 1991, pp. 57–69, Loos et al. "Hybrid Coding with Pre–Buffing and Pre–Analysis in a Software–Based Codec Environment".

*Primary Examiner*—Stella Woo
*Attorney, Agent, or Firm*—Fitzpatrick, Cella, Harper & Scinto

[57] ABSTRACT

Disclosed is a communication apparatus in which coding and/or decoding parameters for coding and/or decoding data can be performed in dialog fashion to make possible the optimum coding of transmitted data and the optimum reproduction of received data. The apparatus includes a coefficient adjusting unit for adjusting coding and/or decoding parameters, and a decode-signal changeover unit for selecting, as an input signal to be decoded, one of a reception signal that has been received through a line and a transmission signal that has been coded, wherein the parameters are adjusted based upon the coded transmission signal. The apparatus further includes an image synthesizing unit for simultaneously displaying an input signal from input means and a decoded signal.

23 Claims, 9 Drawing Sheets

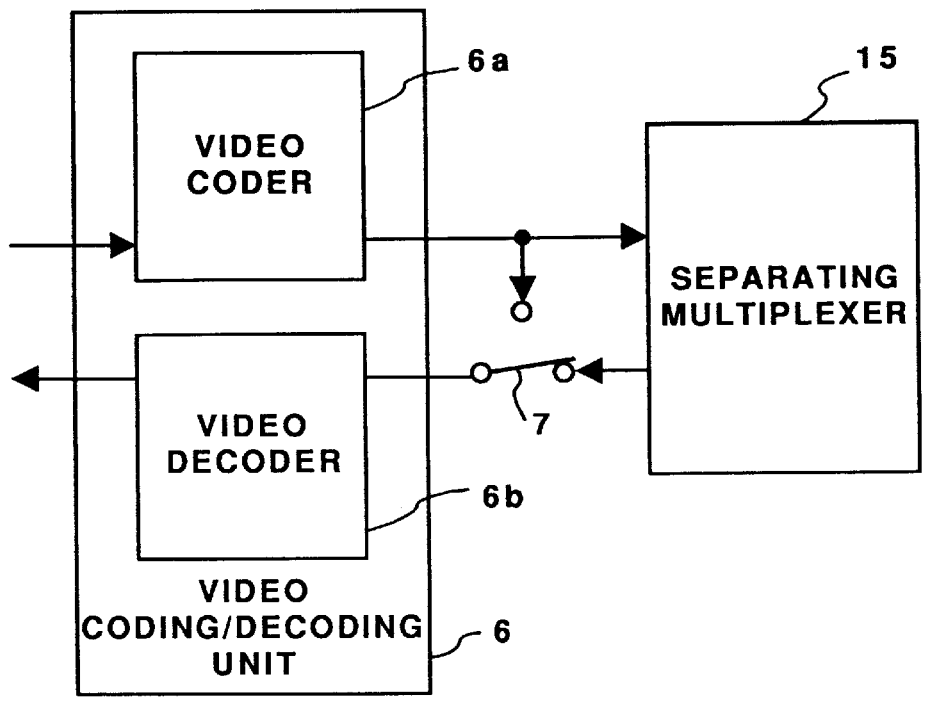
F I G. 2A
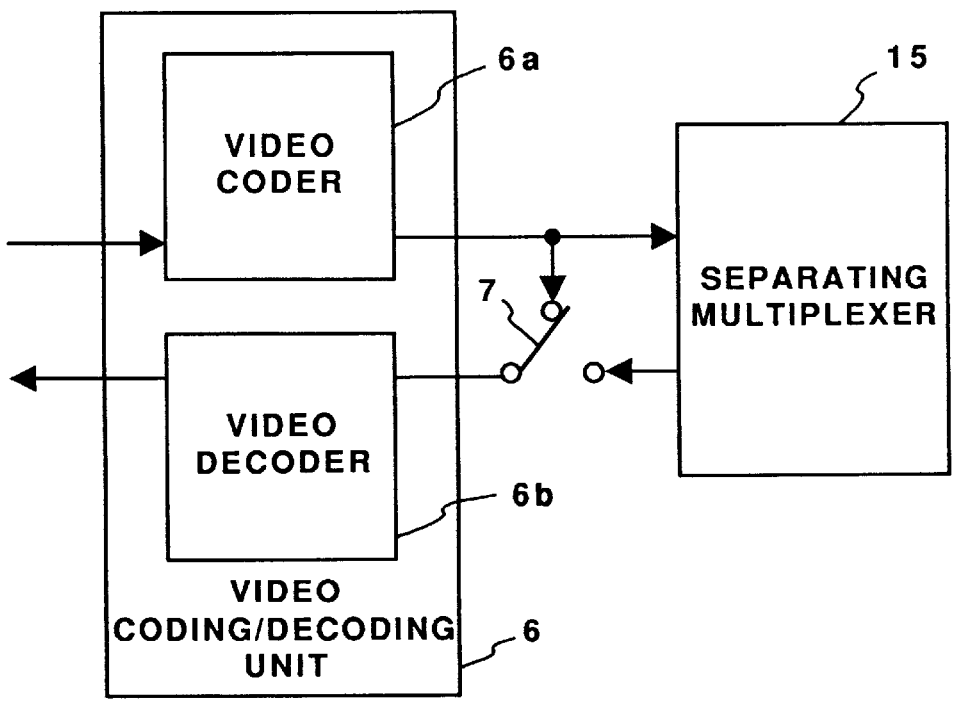
F I G. 2B

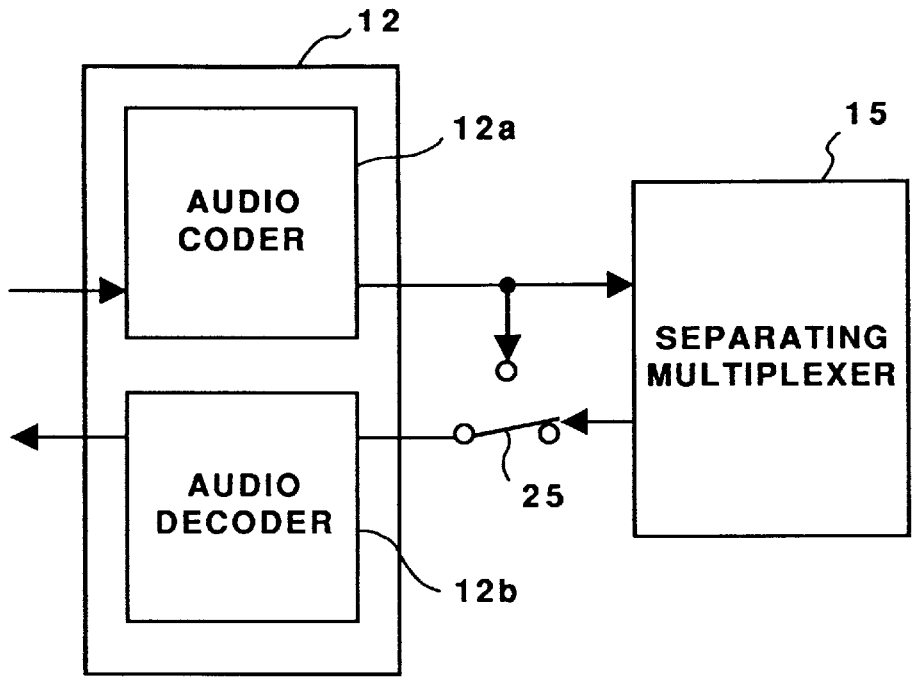
F I G. 6A
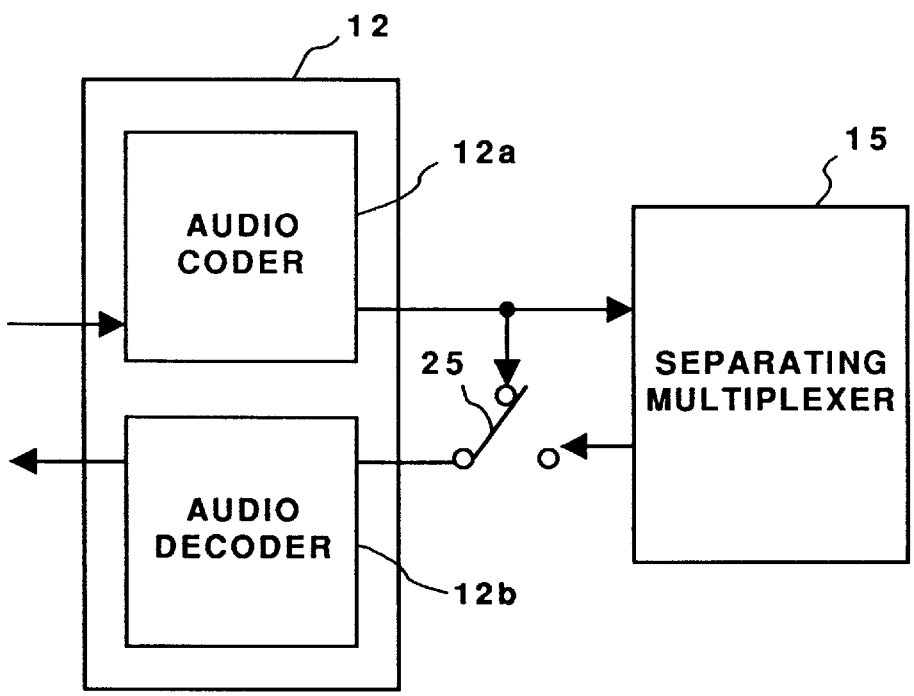
F I G. 6B

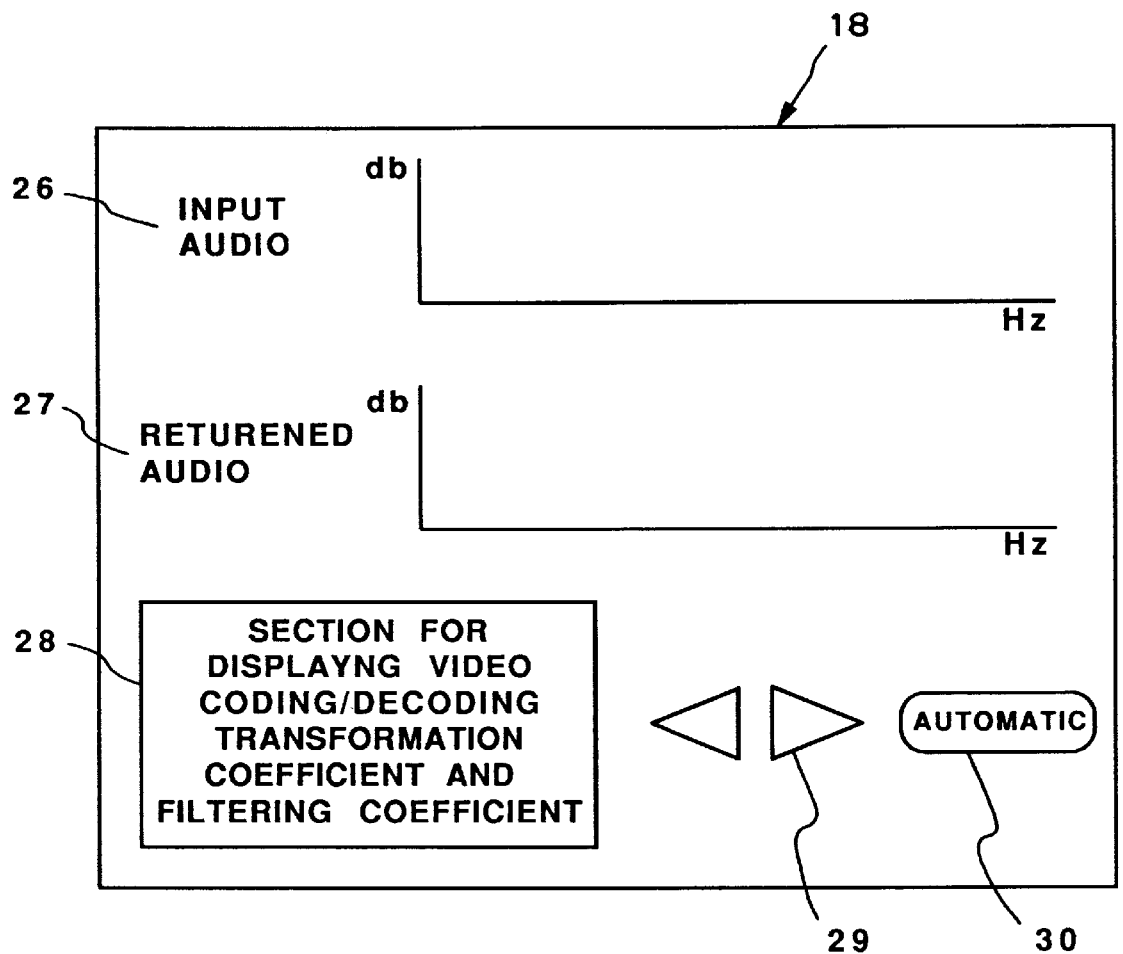
F I G. 7

COMMUNICATION APPARATUS HAVING CODING/DECODING MEANS RESPONSIVE TO A SETTABLE COEFFICIENT

This application is a continuation of application Ser. No. 07/831,514 filed Feb. 5, 1992, now abandoned.

BACKGROUND OF THE INVENTION

1. Field of the Invention

This invention relates to a communication apparatus and, more particularly, to a communication apparatus connected to a two-way communication line such as a common pay station line and having an audio and video communication function, such as a communication apparatus which includes a picture communicating telephone referred to as a visual telephone or conference telephone.

2. Description of the Related Art

FIG. 11 is a block diagram illustrating the general construction of a telephone having a picture communication function and illustrating an example of the conventional communication apparatus. Shown in FIG. 8 are a camera input unit 1, a display unit 2, a video input/output interface 3, a video coding/decoding unit 6 comprising a video coder 6a and a video decoder 6b, a microphone input unit 8, a speaker 9, an audio input/output interface 11, an audio coding/decoding unit 12 comprising an audio coder 12a and an audio decoder 12b, a control panel 13, a system controller 14, a separating multiplexer 15, a line interface 16, and a communication interface 17.

The operation of the prior art will now be described. The input image from the camera input unit 1 enters the video coder 6a through the video input/output interface 3. At the same time, input audio from the microphone input unit 8 enters the audio coder 12a through the audio input/output interface 11. The input image coded by the video coder 6a and the input audio coded by the audio coder 12a are multiplexed by the separating multiplexer 15 and transmitted to the communication line 17 via the line interface 16.

Meanwhile, a received signal from the communication line 17 enters the separating multiplexer 15 through the line interface 16, the multiplexer 15 separates the signal into an image signal and an audio signal, and the image and audio signals enter the video decoder 6b and the audio decoder 12b. The received image decoded by the video decoder 6b is displayed on the display unit 2 via the video input/output interface 3, and the received audio decoded by the audio decoder 12b is outputted to the speaker 9 via the audio input/output interface 11.

With the example of the prior art described above, however, optimum reproduction of the received image or received audio cannot be achieved. Moreover, the manner in which the transmitted image or transmitted audio is being transmitted to the receiving side cannot be verified, and therefore optimum coding also cannot be achieved. These problems are believed to result from certain deficiencies in the prior art, which will now be described.

First, with regard to picture communication, the conventional apparatus is not equipped with means for adjusting coding or decoding parameters. As a consequence, picture quality cannot be set at will. In addition, the input image from a camera and an image (hereinafter referred to as a coded image) which has undergone coding and decoding processing cannot be displayed simultaneously on the same display screen.

As for audio communication, the input audio and audio obtained by coding, returning and decoding this input audio cannot be outputted as audio or displayed on a display screen (as in the form of a spectrum) simultaneously or separately. In addition, audio coding/decoding transformation coefficients and filtering coefficients cannot be freely adjusted by the user. As a consequence, even if the quality of the received audio on the receiving side is unsatisfactory, measures for improving the quality cannot be taken on the transmitting side.

SUMMARY OF THE INVENTION

An object of the present invention is to provide a communication apparatus in which coding and/or decoding parameters for coding and/or decoding each item of data can be performed in dialog fashion to make possible the optimum coding of transmitted data and the optimum reproduction of received data.

Another object of the present invention is to provide a communication apparatus in which an input image and an image obtained by coding, returning and decoding this input image can be displayed on a display screen simultaneously or separately, and in which image coding/decoding transformation coefficients and filtering coefficients, etc., can be adjusted from a control panel.

A further object of the present invention is to provide a communication apparatus in which input audio and audio obtained by coding, returning and decoding this input audio cannot be outputted as audio or displayed on a display screen (as in the form of a spectrum) simultaneously or separately, and in which audio coding/decoding transformation coefficients and filtering coefficients, etc., can be adjusted from a control panel.

According to the present invention, the foregoing objects are attained by providing a communication apparatus comprising coefficient adjusting means for adjusting coding and/or decoding parameters, and decode-signal changeover means for selecting, as an input signal to be decoded, one of a reception signal that has been received through a line and a transmission signal that has been coded, wherein the parameters are adjusted based upon the transmission signal that has been coded.

In an embodiment, the apparatus further comprises image synthesizing means for simultaneously displaying an input signal from input means and a decoded signal.

By providing the communication apparatus thus constructed with the decode-signal changeover means and the coefficient adjusting means, a transmission signal that has undergone coding processing is decoded and displayed on a display unit, and the coding and decoding parameters can be adjusted. In addition, by using the image synthesizing means, the signal obtained by decoding the transmission signal that has undergone coding processing and the input signal can be displayed on the display unit at the same time. As a result, the coding and decoding parameters can be adjusted in dialog fashion.

In another embodiment, the above-mentioned signal is an image signal, and the communication apparatus comprises image coefficient adjusting means for adjusting coding and/or decoding parameters in order to change picture quality, and decode-signal changeover means for selecting, as an input signal to be decoded, one of a reception image that has been received through a line and a transmission image that has been coded, wherein the picture quality is adjusted based upon the transmission picture that has been coded.

In an embodiment, the apparatus further comprises image synthesizing means for simultaneously displaying an input image from image input means and a decoded image.

Furthermore, adjustment of the image entails adjusting picture quality based upon the image after it has been decoded.

In another embodiment, the above-mentioned signal is an audio signal, and the communication apparatus comprises audio coefficient adjusting means for adjusting coding and/or decoding parameters in order to change sound quality, and decode-signal changeover means for selecting, as an input signal to be decoded, one of reception audio that has been received through a line and transmission audio that has been coded, wherein the sound quality is adjusted based upon the transmission audio that has been coded.

In an embodiment, the apparatus further comprises converting means for converting audio into a corresponding image, and image synthesizing means for simultaneously displaying input audio from converted-audio input means and decoded audio. Furthermore, adjustment of the audio entails adjusting sound quality based upon the audio after it has been decoded.

A further object of the present invention is to provide a communication apparatus for moving images wherein the adjustment of images can be performed by simple operation from the screen.

Still further object of the present invention is to provide a communication apparatus having novel functions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram showing the connections of a switch portion for input-image return in a video coding/decoding unit, in which FIG. 2(A) illustrates the state of normal transmission/reception, and FIG. 2(B) is a block diagram showing the state of input-image return.

FIG. 6 is a diagram showing the changeover state of a switch portion for returning the input audio of an audio coding/decoding unit, in which FIG. 6B illustrates the state of the switch when input audio is returned, and FIG. 6A illustrates the state of the switch at the time of ordinary transmission/reception;

FIG. 7 is a plan view showing an example of a display screen displaying an audio signal, in which spectrum display sections for input audio and audio obtained by coding and then return-decoding the input audio are illustrated;

DESCRIPTION OF THE PREFERRED EMBODIMENTS

An embodiment of the present invention will now be described with reference to the drawings. In this embodiment, a communication apparatus which handles image information and audio information will be described as an example. However, the apparatus may deal with multimedia information, such as text information or graphics information, other than audio information.

Figure 1:
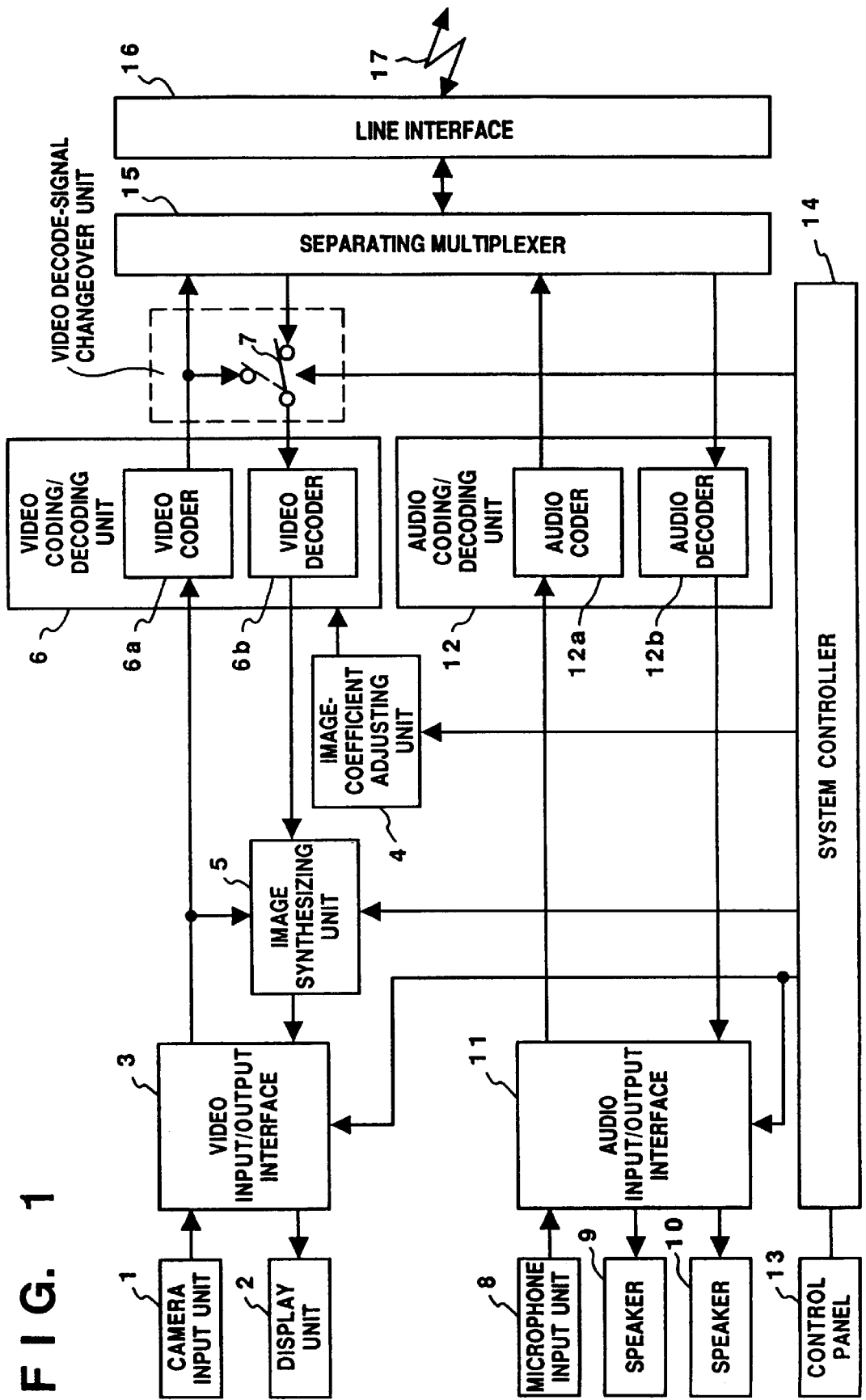
FIG. 1 is a block diagram showing the construction of a communication apparatus according to an embodiment of the present invention.

FIG. 1 is a block diagram showing the general construction of the communication apparatus according to this embodiment. Numeral 1 denotes a camera serving as input means for inputting the picture of a human being, a drawing or the like as a moving image. A display unit 2 is for displaying the moving image inputted by the camera 1, a received image from a communicating party, a control display screen, etc. A video input/output interface 3 responds to a command from a system controller 14 by executing processing to changeover the image input means. An image-coefficient adjusting unit 4 adjusts a transformation coefficient or filtering coefficient of a video coding/decoding unit 6 based upon a command from the system controller 14. An image synthesizing unit 5 responds to a command from the system controller 14 by performing display changeover processing to effect a changeover among the images, such as the transmission image, received image and control display screen, as well as image-signal synthesizing processing for displaying these images on the display unit 2 subdivided form.

Numeral 6, e.g., denotes a video coding/decoding unit which, in accordance with CCITT recommendation draft H.261, executes processing for coding the transmission-image signal and processing for decoding the received-image signal. The video coding/decoding unit 6 includes a video coder 6a and a video decoder 6b. In the encoding process, an irreversible compressing method is employed. A video decode-signal changeover unit 7 changes over between the received image and the transmission image to select the image that is inputted to the video decoder 6b. A microphone input unit 8 serves as the audio input means of the apparatus. Speakers 9, 10 are the audio output means of the apparatus. Numeral 11 denotes an audio interface which, based upon commands from the system controller 14, executes processing for changing over among the microphone 8 and speakers 9, 10, echo cancelling processing for eliminating echo produced by the microphone 8 and speakers 9, 10, and tone generating processing for generating a dial tone, a ring-back tone, a busy tone and an incoming-call tone, etc.

Numeral 12 denotes an audio coding/decoding unit which, in response to a command from the system controller 14, and in accordance with an audio-signal coding/decoding algorithm, such as 64 Kbps PCM A-law, 64 Kbps PCM μ-law, 64 Kbps/56 Kbps/48 Kbps SB-ADPCM, 32 Kbps ADPCM, 16 Kbps (e.g., APC-AB), 8 Kbps, etc., codes a transmission audio signal and decodes a received audio signal. Numeral 13 denotes a control panel, such as a keyboard or touch panel, utilized in inputting control information for overall control of the apparatus.

The system controller 14 has a CPU, a ROM, a RAM and an auxiliary memory unit and monitors the states of various components, creates control/display screens which conform to the state of the overall apparatus, and for executes application programs. In accordance with CCITT advisory H.221, a separating multiplexer 15 multiplexes, in transmission frame units, the audio signal from the audio coding/ decoding unit 12, the image signal from the video coding/ decoding unit 6, and a control signal from the system controller 14, and separates a received frame into each medium (image, audio and control signal) constituting the received frame. A line interface 16 controls the line in accordance with an ISDN user/network interface. Numeral 17 denotes the communication line.

Figure 3:
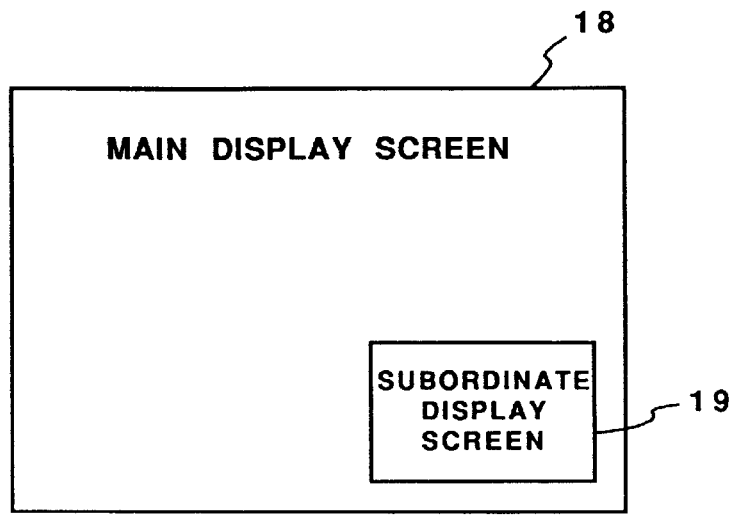
FIG. 3 is a diagram showing an example of a display screen when picture-in-picture processing is executed.

The operation of this embodiment will now be described. The input image signal from the camera 1 is branched into two paths via the video input/output interface unit 3 and enters the image synthesizing unit 5 and the video coder 6a. The video decode-signal changeover unit 7 usually is connected as shown in FIG. 2A. The signal outputted by the video coder 6a is transmitted to the other party via the separating multiplexer 15, the line interface 16 and the communication line 17. A received image signal from the other party enters the image synthesizing unit 5 via the video decoder 6b. On the basis of a command from the system controller 14, the image synthesizing unit 5 selects the input image signal from the camera 1 or the received image signal from the video decoder 6b, or executes picture-in-picture processing, and displays the result on the display unit 2. Picture-in-picture processing entails outputting both images on the same screen. As example of such a screen is shown in FIG. 3.

On the other hand, when the video decode-signal changeover unit 7 is connected to the side of the video coder 6a, as shown in FIG. 2B, the signal from the video coder 6a is outputted not only to the line side, as in the usual operation, but also to the side of the video decoder 6b. As a result, the received image signal from the other party is cut off from the video decoder 6b and only the output from the video coder 6a enters the image synthesizing unit 5 via the video decoder 6b. The system controller 14 selects the input image signal from the camera 1 or the coded image signal applied thereto via the video coder 6a and the video decoder 6b, or executes picture-in-picture processing, in accordance with manual operations with the control panel 13, controls the image synthesizing unit 5 to display the result on the display unit 2.

Figure 4:
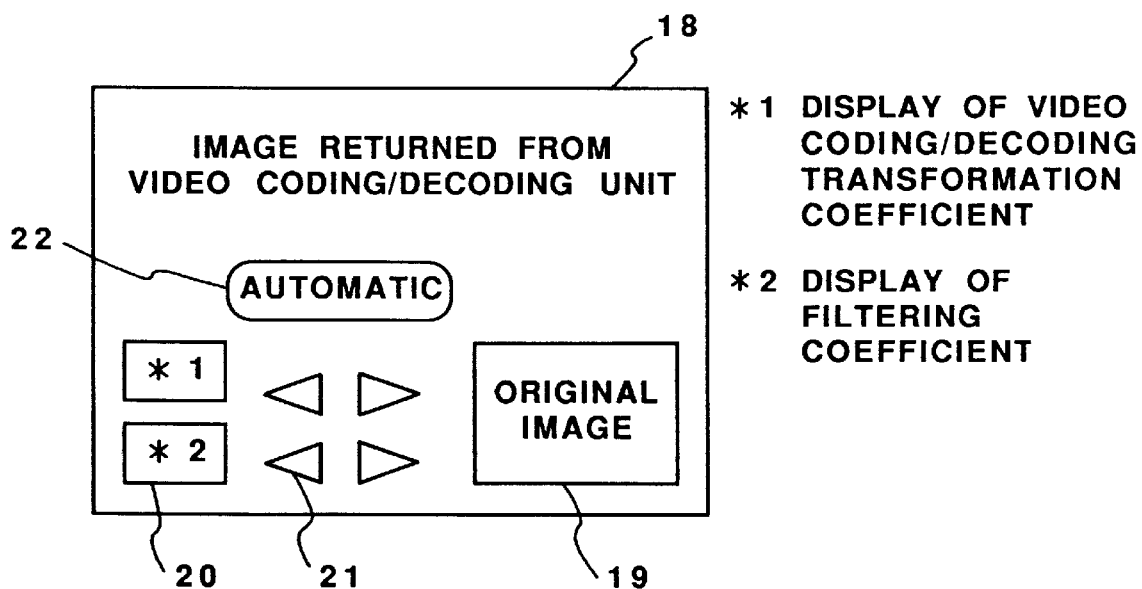
FIG. 4 is a diagram showing an example of the states of a control panel and display unit for adjusting coding or decoding parameters while comparing an input image and a coded image.

The image-coefficient adjusting unit 4 receives a command from the system controller 14 on the basis of an input from the control panel 13 and is capable of adjusting the picture quality of a transmission image by changing coding or decoding parameters in the video coding/decoding unit, examples of such parameters being transformation coefficients, coding bit-distribution parameters and loop filter coefficients. Practically, this adjustment can be achieved by changing quantizing coefficients for quantizing DCT-converted image data, or by changing the size or coefficients of a smoothing filter for smoothing received image data. In addition, optimum coefficients can be decided automatically in an automatic mode. FIG. 4 illustrates an example in which an LCD and a touch panel are imagined as being the control panel 13 and display unit 2. In this embodiment, the display unit 2 and the control panel 13 are made from, e.g., a liquid crystal display and a touch-panel on the liquid crystal display. The video input/output interface 3 includes a character generator indicating patterns by operation (as shown in FIG. 4) on the control panel 13. At this time, if the input image from the camera 1 and the coded image signal are displayed on the display unit 2 upon being subjected to picture-in-picture processing, the adjustment of the transmission picture quality in the image-coefficient adjusting unit 4 can be performed while comparing the results of coding processing with the input image.

Thus, in accordance with this embodiment, there is provided an image communication apparatus in which coding and decoding parameters can be adjusted while carrying on a dialog with the apparatus. Furthermore, the input image from a camera and an image obtained by decoding a transmission image that has been subjected to coding processing can be simultaneously displayed on the same display screen and compared. In addition, the adjustment of the quality of the transmission image (the adjustment of the coding and decoding parameter such as the video coding/ decoding transformation coefficients or filtering coefficients) can be performed from a control panel based upon the comparison. As a result, the picture quality of the transmission image can be readily changed in dialog fashion to make possible an improvement in quality.

Figure 5:
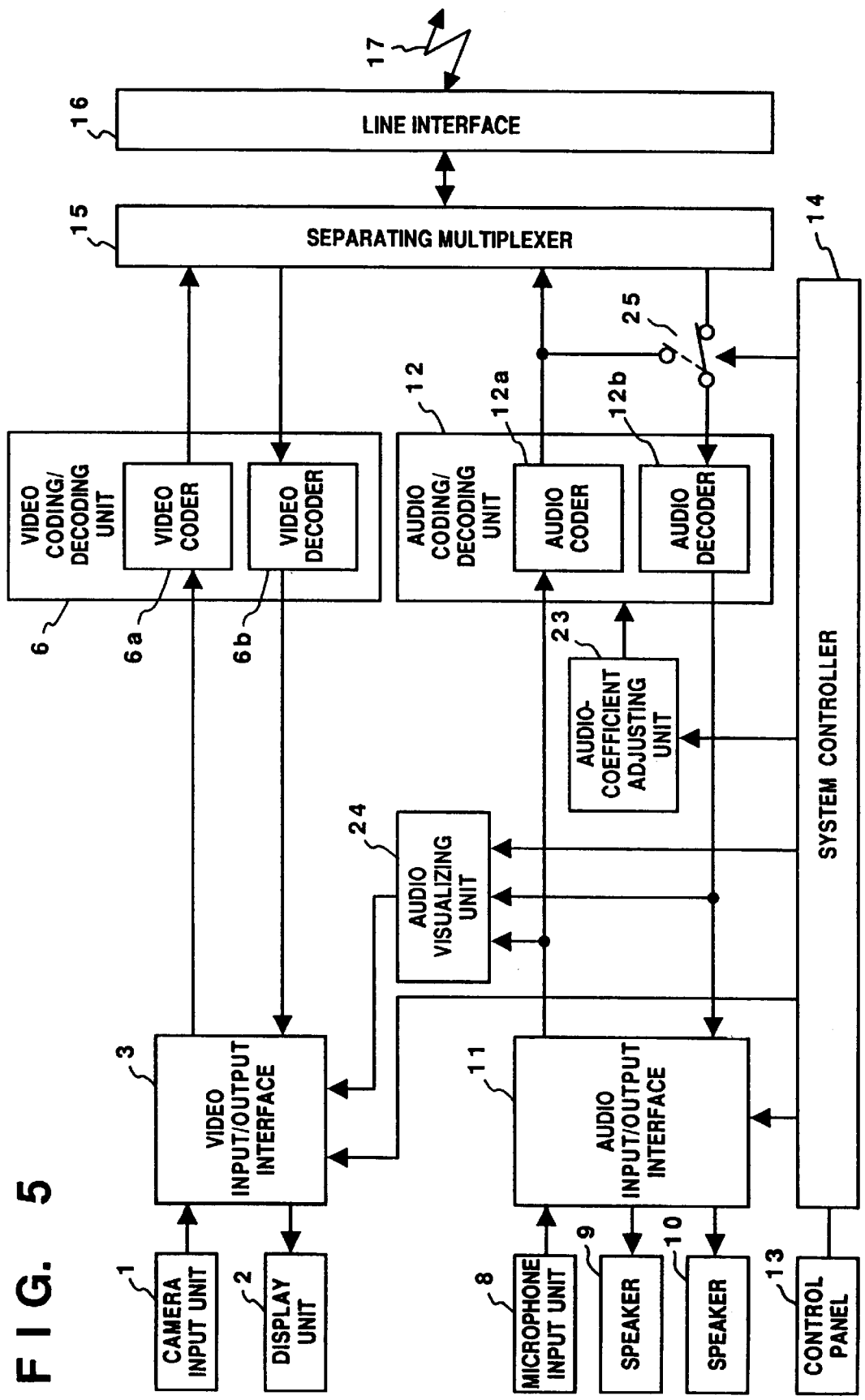
FIG. 5 is a block diagram showing the construction of a communication apparatus according to another embodiment of the present invention.

FIG. 5 illustrates another embodiment of a communication apparatus according to the invention. Here the camera 1 serving as image input means is for inputting a self-portrait of the caller or a document such as a drawing. The display unit 2 is for displaying the input image from the camera 1, a received image from the communicating party, a control display screen, etc. The video input/output interface 3 responds to a command from the system controller 14 by executing processing to changeover the screen of the camera 1 serving as the image input means. In accordance with CCITT recommendation draft H.261, the video coding/ decoding unit 6 executes processing for coding the transmission-image signal and processing for decoding the received-image signal. The video coding/decoding unit 6 includes the video coder 6a and the video decoder 6b. The microphone input unit 8 serves as the audio input means of the apparatus. The speakers 9, 10 are the audio output means of the apparatus. Based upon commands from the system controller 14, the audio input/output interface 11 executes processing for changing over among the microphone input unit 8 and speakers 9, 10, which are the audio input/output means echo cancelling processing for eliminating echo produced when the microphone input unit 8 and speakers 9, 10 are used, and tone generating processing for generating a dial tone, a ring-back tone, a busy tone and an incoming-call tone, etc.

Numeral 24 denotes an audio visualizing unit which, in response to a command from the system controller 14, is for producing a display (such as a spectrum display) of the input audio and either audio obtained by decoding and returning the input audio or audio that has been received from the other party. Numeral 23 denotes an audio-coefficient adjusting unit which, in response to a command from the system controller 14, adjusts the transformation coefficients or filtering coefficients of the audio coding/decoding unit 12.

In response to a command from the system controller 14, and in accordance with an audio-signal coding/decoding algorithm, such as 64 Kbps PCM A-law, 64 Kbps PCM μ-law, 64 Kbps/56 Kbps/48 Kbps SB-ADPCM, 32 Kbps ADPCM, 16 Kbps (e.g., APC-AB), 8 Kbps, etc., the audio coding/decoding unit codes a transmission audio signal and decodes a received audio signal. Numeral 25 denotes an audio decode-signal changeover unit which changes over between the received audio and by-passed transmission audio to select the audio that is inputted to the audio coding/decoding unit 12a. The control panel 13, which has as a keyboard or touch panel, etc., is utilized in inputting control information for overall control of the apparatus.

The system controller 14 has a CPU, a ROM, a RAM and an auxiliary memory unit, monitors the states of various components to control the overall apparatus, creates control/ display screens which conform to the state of the overall apparatus, and for executes application programs.

In accordance with CCITT advisory H.221, the separating multiplexer 15 multiplexes, in transmission frame units, the audio signal from the audio coding/decoding unit 12, the image signal from the video coding/decoding unit 6, and a control signal from the system controller 14, and separates a received frame into each medium constituting the received frame. The line interface 16 controls the line in accordance with an ISDN user/network interface, by way of example. Numeral 17 denotes the communication line.

The operation of the circuit shown in FIG. 5 will now be described. The input audio signal from the microphone input 8 is branched into two paths via the audio input/output interface 11 and enters the audio visualizing unit 24 and the audio coder 12a. The audio signal inputted to the audio coder 12a is transmitted to the other party via the separating multiplexer 15, the line interface 16 and the communication line 17. The audio decode-signal changeover unit 25 usually is connected to the side of the separating multiplexer 15, as shown in FIG. 6A. A received audio signal from the other party enters the audio visualizing unit 24 and the audio input/output interface 11 from the separating multiplexer 15 via the audio decoder 12b. The audio signal which has entered the audio input/output interface 11 is outputted from the speakers 9, 10. The audio visualizing unit 24 converts the transmission audio signal and the received audio signal into signals (such as frequency spectra) that can readily be confirmed by eye. The converted signals are outputted to the video input/output interface as image signals. As a result, the quality of the audio can be confirmed and compared by observation.

The audio decode-signal changeover unit 25 can be changed over to the by-pass contact of the audio coder 12a, as illustrated in FIG. 6B. At this time, the signal (the transmission audio signal) from the audio coder 12a can be outputted simultaneously to the communication line 17, in the same manner as during ordinary operation, and to the audio decoder 12b. As a result, the received audio signal from the other party is cut off from the audio decoder 12b and only the transmission audio signal from the audio coder 12a enters. In the same manner as when the received audio signal arrives, the transmission audio signal is outputted to the audio visualizing unit 24 and the audio input/output interface 11.

The audio-coefficient adjusting unit 23 receives a command from the system controller 14 on the basis of an input from the control panel 13 and changes the transformation coefficients and filtering coefficients of the audio coding/ decoding unit 12, thereby making it possible for the user to freely adjust the quality of the transmitted audio. In addition, optimum coefficients can be decided automatically in an automatic mode FIG. 7 illustrates an example of the external appearance of a front portion of the apparatus in which an LCD (liquid-crystal display) and a touch panel are imagined as being the control panel 13 and display unit 2. In FIG. 7, numeral 18 denotes a display screen of the display unit 2, numerals 26, 27 designate audio spectrum-display sections, and numeral 28 represents a display section for audio coding/decoding transformation coefficients and filtering coefficients. Shown at numeral 29 is a touch switch, which constitutes part of the control panel 13, for adjusting the audio coding/decoding transformation coefficients and filtering coefficients. Numeral 30 denotes an automatic mode switch, which is a touch switch constituting part of the control panel 13.

In accordance with this embodiment of the present invention, input audio from an audio input unit and audio obtained by coding, sending back and decoding the input audio can be outputted as audio simultaneously or separately or displayed on a display screen (as in the form of a spectrum display) simultaneously or separately, and the audio coding/ decoding coefficients and filtering coefficients can be adjusted from the control panel. As a result, the sender can predict the quality of the audio that will be received by the other party. Furthermore, the other party can be provided with an audio transmission of improved quality based upon the prediction, or with an audio transmission whose quality is based upon a desired setting made by the sender.

Though the first embodiment is for adjusting images and the second embodiment is for adjusting audio, it goes without saying that a communication apparatus can be adapted to combine both of these functions.

Figure 8:
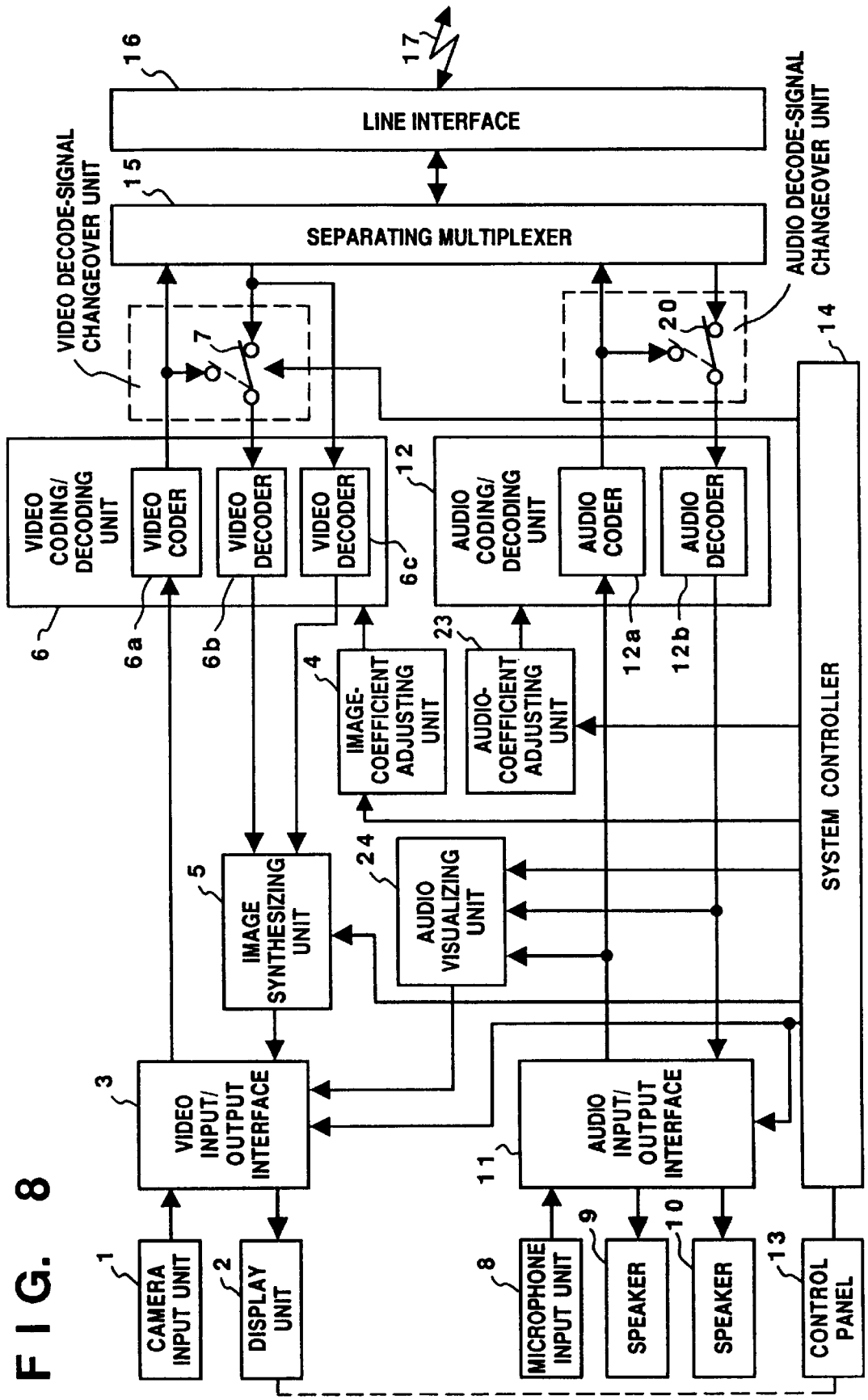
FIG. 8 is a block diagram showing the construction of further embodiment of the present invention.

FIG. 8 is a block diagram of an apparatus having the functions described in both the first and second embodiments. In FIG. 8, the apparatus has the function described with reference to FIG. 1 and the function described with reference to FIG. 5, and the display is manually switched between FIG. 4 and FIG. 7 by the control panel 13, e.g. a touch-panel on the display screen as shown in FIGS. 4 and 7. The elements identical to those in FIGS. 1 and 5 are given the same numerals in FIG. 8 and therefore an explanation will be omitted.

In addition to the video decoder 6b in FIG. 1, a video decoder 6c receives coded image data directly from the separating multiplexer 15, whereas the video decoder 6b receives the coded image data via video decoder-signal changeover unit 7. An image synthesizing unit 5' receives two types of coded image data from the video decoder 6b and 6c and image data from the video input/output interface 3, then synthesizes and displays the image data as shown in FIGS. 4 and 7.

Figure 9:
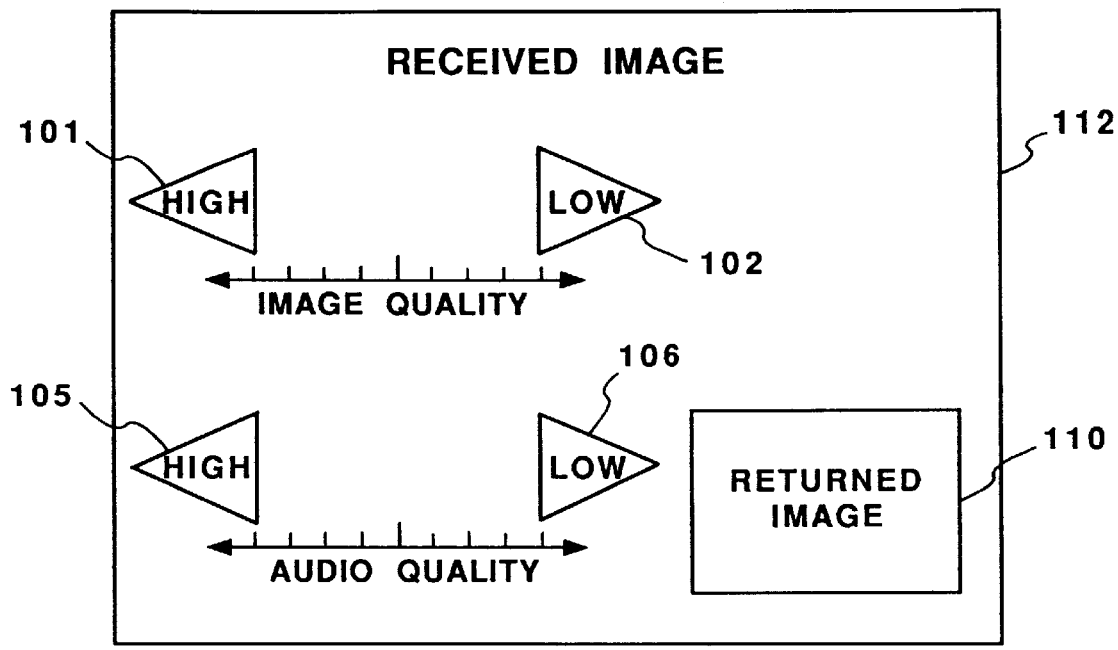
FIG. 9 is a diagram showing an example of a display screen of the embodiment in FIG. 8.

In this embodiment, since the decoder 6b and 6c are prepared and the outputs from the decoder 6b 6c can be synthesized by the image synthesizing unit 5', as shown in FIG. 9, the area where the decoded image from the other party is displayed and the area where the image data which is received from the camera input unit 1, encoded and then decoded is displayed can be displayed on the screen at the same time. These displayed image data are moving images so the present apparatus are easily controlled by the operator.

Though in the first and second embodiments, "audio coefficient" or "filtering coefficient" is displayed for adjusting, in this embodiment, level of image quality and audio quality can be displayed on the screen as a figure and adjusted easily, as shown in FIG. 9. The numerals 101 and 102 are touch-switches made from touch-panel respectively to rise and to lower image quality; 105 and 106, touch-panels respectively to rise and to lower audio data quality. In accordance with the manual operation at the touch-switches, the system controller 14 gives control signals to the image-coefficient adjusting unit 4 and the audio-coefficient adjusting unit 23 in order to adjust the respective coefficients.

Figure 10:
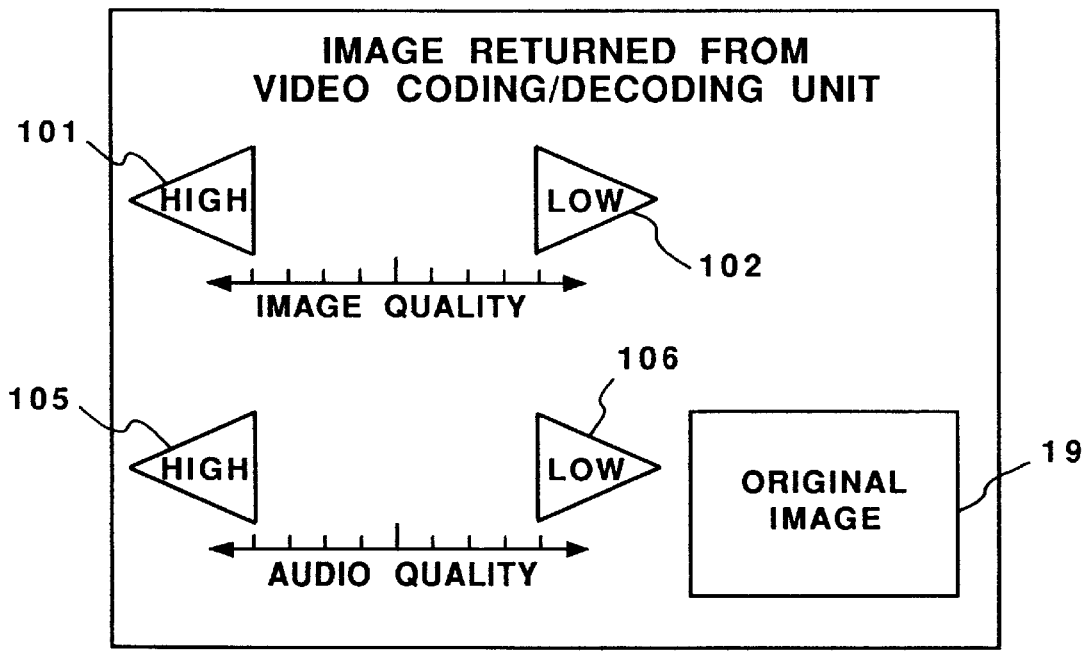
FIG. 10 is a diagram showing another example of a display screen of the embodiment in FIG. 4.
Figure 11:
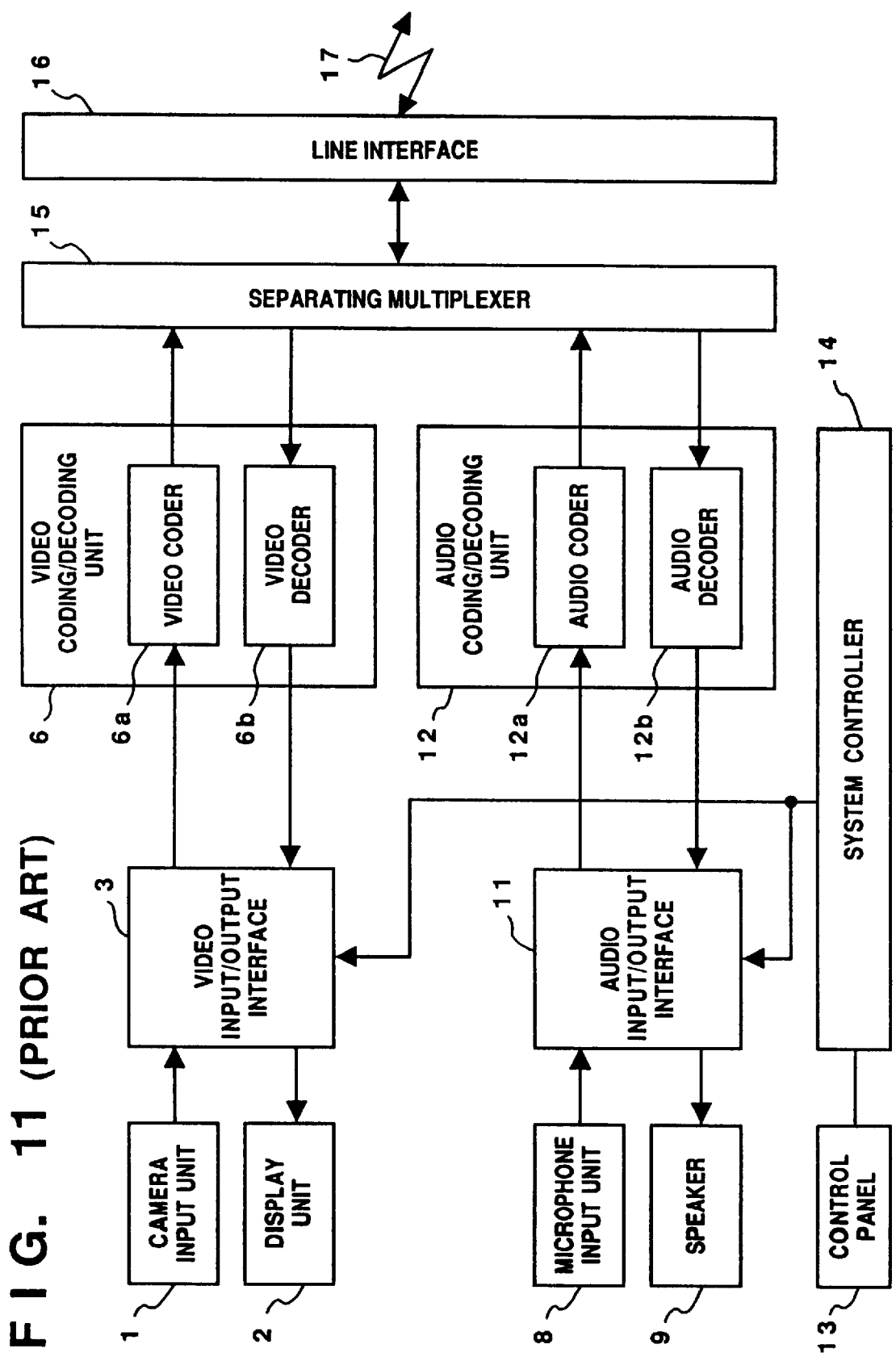
FIG. 11 is a block diagram showing an example of the circuit construction of an image communication telephone according to the prior art.

According to this embodiment, image data received from the other party and decoded by the decoder 6c and image data to be transmitted to the other party which has been coded in accordance with a predetermined characteristics and has been decoded, can be displayed on the screen of the display unit 2 at the same time '=. The operator can set a coding characteristics from the control panel 13 in accordance with the characteristics of the received image data. It is very useful that the operator also can use the touch-switches 101, 102, 105 and 106 while the display unit 2 displays received image data transmitted from the other party (during the communication with the other party). FIG. 10 illustrates an example where the display unit 2 displays both original images and images returned from video coding/decoding unit 6 as shown in FIG. 4, and in this example, the operator can also use the touch-switches 101, 102, 105 and 106 in the same manner.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:
   coding/decoding means for encoding original image data to be transmitted in accordance with a settable coefficient, and for decoding the encoded image data to provide decoded image data, said settable coefficient operative to adjust image quality;
   output means for outputting an original image represented by the original image data and a decoded image represented by the decoded image data in respectively different output forms;
   first setting means for manually setting a new settable coefficient, wherein said new settable coefficient directly affects image quality of the decoded image output by said output means by affecting encoding by said coding/decoding means; and
   second setting means for automatically setting the coefficient for encoding and decoding.

2. A communication apparatus according to claim 1, wherein said coefficient is a quantizing coefficient.

3. A communication apparatus according to claim 1, wherein said coefficient is a size of filter used in a filtering process or a filtering coefficient.

4. A communication apparatus according to claim 1, wherein said original image includes a moving image.

5. A communication apparatus according to claim 1, further comprising audio communicating means for communicating audio data.

6. A method for adjusting image quality of a communications apparatus, comprising the steps of:
   encoding original image data to be transmitted in accordance with a settable coefficient, and decoding the encoded image data to provide decoded image data, said settable coefficient operative to adjust image quality;
   outputting an original image represented by the original image data and a decoded image represented by the decoded image data in respectively different output forms;
   manually setting a new settable coefficient, wherein said new settable coefficient directly affects image quality of the decoded image output in said output step by affecting encoding by said coding/decoding step, and
   automatically setting the coefficient for encoding and decoding.

7. A method according to claim 6, wherein said coefficient is a quantizing coefficient.

8. A method according to claim 6, wherein said coefficient is a size of filter used in a filtering process or a filtering coefficient.

9. A method according to claim 6, wherein said original image includes a moving image.

10. A method according to claim 6, further comprising a step of communicating audio data.

11. A communication apparatus comprising:
    input means for inputting first image data;
    receiving means for receiving second image data from an external apparatus;
    coding/decoding means for encoding the first image data to be transmitted in accordance with a settable coefficient, and for decoding the encoded first image data to provide decoded first image data, said settable coefficient operative to adjust image quality;
    output means for outputting a second image represented by the second image data and a first image represented by the decoded first image data; and
    manually setting means for setting a new settable coefficient, wherein said new settable coefficient directly affects image quality of the first image output to the monitor by affecting coding by said coding/decoding means, said setting means being operational while said receiving means is receiving the second image data, and
    automatic setting means for automatically setting the coefficient for encoding and decoding.

12. A communication apparatus comprising:
    input means for inputting original image data;
    coding/decoding means for encoding the original image data to be transmitted in accordance with a settable coefficient, and for decoding the encoded image data to provide decoded moving image data, said settable coefficient operative to adjust image quality;
    output means for outputting an original image represented by the original image data and a decoded image represented by the decoded image data in respectively different output forms; and
    setting means for manually and automatically setting the coefficient for encoding and decoding.

13. A communication apparatus according to claim 12, wherein said coefficient is a quantizing coefficient.

14. A communication apparatus according to claim 12, wherein said coefficient is a size of filter used in a filtering process or a filtering coefficient.

15. A communication apparatus according to claim 12, wherein said original image includes a moving image.

16. A communication apparatus according to claim 12, further comprising audio communicating means for communicating audio data.

17. A method for adjusting image quality of a communication apparatus, comprising the steps of:
    inputting original image data;
    encoding the original image data to be transmitted in accordance with a settable coefficient, and decoding the encoded image data to provide decoded moving image data, said settable coefficient operative to adjust image quality;
    outputting an original image represented by the original image data and a decoded image represented by the decoded image data in respectively different output forms; and
    manually and automatically setting the coefficient for encoding and decoding.

18. A method according to claim 17, wherein said coefficient is a quantizing coefficient.

19. A method according to claim 17, wherein said coefficient is a size of filter used in a filtering process or a filtering coefficient.

20. A method according to claim 17, wherein said original image includes a moving image.

21. A method according to claim 17, further comprising a step of communicating audio data.

22. A communication apparatus for communicating with a remote terminal, said communication apparatus comprising:

encoding means for encoding moving image information to provide encoded image information to be transmitted to the remote terminal and for decoding received moving image information received from the remote terminal;

decoding means for decoding the encoded moving image data provided by said encoding means to provide decoded moving image information and for outputting the decoded moving image information provided by said decoding means to a display;

means for generating encoding parameters for said encoding means; and means for adjusting said encoding parameters so as to change a quality of the encoded moving image information while the decoded moving information is being output to the display, wherein said adjustment means is operable to adjust said encoding parameters during transmission of the encoded moving image information to the remote terminal.

23. A method operative in communication apparatus for communicating with a remote terminal, said method comprising the steps of:

encoding moving image information to provide encoded image information to be transmitted to the remote terminal, the communication apparatus being operative to decode received moving image information received from the remote terminal;

decoding the encoded moving image data provided at said encoding step to provide decoded moving image information;

outputting the decoded moving image information provided at said decoding step to a display;

generating encoding parameters for said encoding step; and adjusting said encoding parameters so as to change a quality of the encoded moving image information while the decoded moving information is being output to the display, wherein said adjustment step is operable to adjust said encoding parameters during transmission of the encoded moving image information to the remote terminal.

* * * * *